Aug. 16, 1932.  E. L. HALLINAN  1,871,608
TIRE CASING CONVEYER
Filed Feb. 16, 1931

INVENTOR
Edward L. Hallinan
BY
Evans & McCoy
ATTORNEYS

Patented Aug. 16, 1932

1,871,608

UNITED STATES PATENT OFFICE

EDWARD L. HALLINAN, OF AKRON, OHIO, ASSIGNOR TO THE GENERAL TIRE & RUBBER COMPANY, OF AKRON, OHIO, A CORPORATION OF OHIO

TIRE CASING CONVEYER

Application filed February 16, 1931. Serial No. 516,091.

This invention relates to material conveying mechanism and particularly to mechanism for conveying pneumatic tire casings during the manufacture thereof.

One of the objects of the present invention is to provide new and improved means for conveying pneumatic tire casings during the manufacture thereof.

Another object is to provide an improved conveying unit for pneumatic tire casings, whereby construction operations may be performed on the tire casings without bodily removing the casings from the conveying units.

Another object is to provide a conveying unit for use in the manufacture of tire casings whereby the tires may be easily rotated thereon while being conveyed from one place to another, thereby permitting manufacturing operations to be easily and quickly performed thereon.

A further object is to provide a conveying unit for use in the manufacture of tire casings whereby the tires may be supported in such a manner that they can be rotated without side play or transverse movement in a given plane, to permit manufacturing operations to be quickly and easily performed thereon.

With the above and other objects in view which will be apparent from the following detailed description, the present invention consists in certain features of construction and combinations of parts which will be readily understood by those skilled in the art to which the invention appertains.

In the drawing which illustrates suitable embodiments of the present invention,

Figure 2:
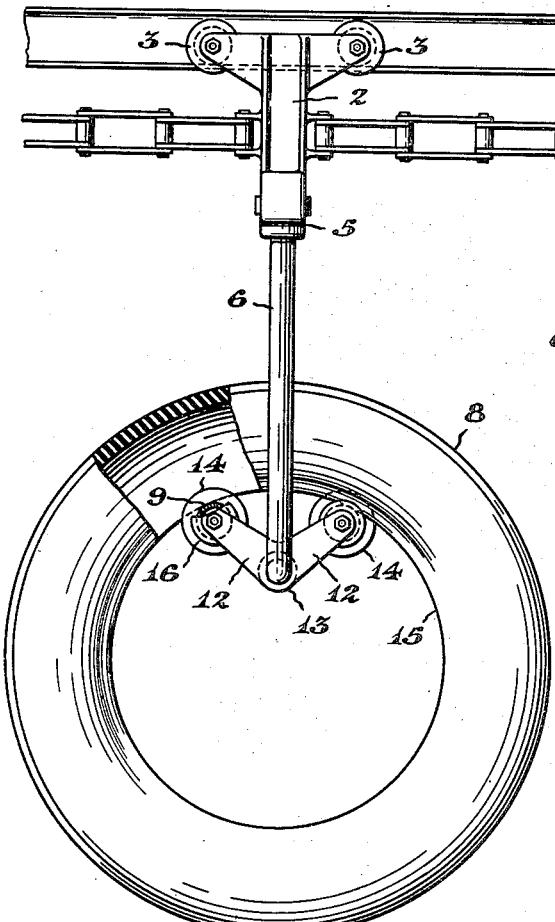
Fig. 2 is an end elevation of the tire conveying unit showing the tire casing and conveying track and carriage in side elevation, and also showing the position of the tire casing with respect to the supporting rollers of the conveying unit.

In the manufacture of pneumatic tire casings on a large scale, tires after they are removed from the vulcanizers are frequently placed on suitable conveyers for the transmission to the storage room, shipping room or other desired departments. During the period of transmission, the flash resulting from the flow of rubber between the mating mold sections is removed, and also it is customary practice to paint the external surfaces of the tire casing with a suitable protective coating. It is the purpose of the present invention to provide suitable conveying means of such construction that these finishing operations may be quickly and easily performed without the necessity of removing the tire casings from the conveying mechanisms.

I have provided means for use with an overhead traveling conveyer whereby the tire casings are freely suspended in such a manner that they can be rotated on the conveyer unit without danger of displacement or moving transversely from side to side of the conveying means during rotation. This means greatly assists the workmen during removal of the circumferential flash and during the painting operation.

Referring to the accompanying drawing in which like numerals refer to like parts throughout the several views, the preferred type of conveying unit is of the overhead type embodying an overhead guide track 1, a supporting carriage 2 arranged to be suspended on rollers 3 on the track 1 and to be moved along the track 1 by means of suitable chains 4 or cables connecting the supporting carriages 2.

Figure 1:
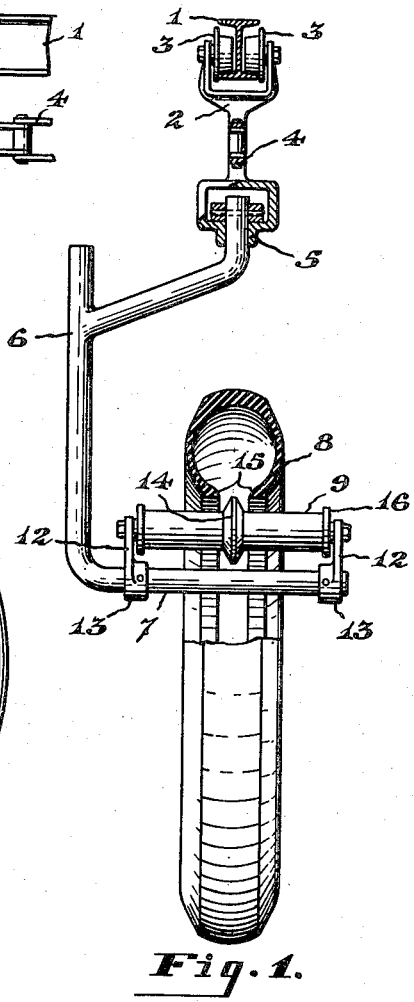
Figure 1 is a side elevation of the tire conveying unit, the conveying track and a portion of the tire casing being shown in transverse section.

As shown in Figs. 1 and 2, the carriage 2 is provided with a journal portion 5 extending below the operating chains 4 which rotatably support the bracket 6, the bracket 6 having the vertical portion extending vertically and axially through the journal portion 5.

The bracket 6 is formed with an offset bend and it terminates in a horizontal bar portion 7, the offset bend providing an unobstructed space between the bar 7 and carriage 2 for the reception of the tire casing.

Figure 3:
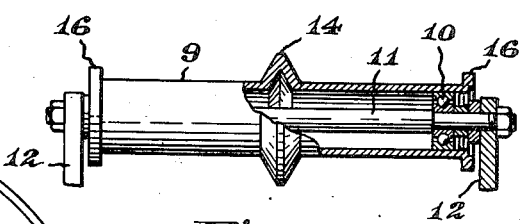
Fig. 3 is an enlarged view of one of the rollers for supporting the tire casing on the conveying device, a portion of the roller being broken away and shown in section to illustrate the means for supporting the same.

The tire casing 8 to be conveyed is supported on the bar 7 preferably by means of a pair of spaced rollers 9. These rollers 9 are preferably provided with anti-friction bearings 10 as shown in Fig. 3, and are mounted for free rotation on suitable shafts 11. Each shaft 11 is carried by spaced arms 12 which are formed integral with suitable brackets 13 rigidly secured to the bar 7. Each bracket 13, as shown in Fig. 2, is formed with two such arms 12 extending upwardly therefrom to support the pair of shafts 11 in parallel spaced relationship.

The tire casing 8 being conveyed is supported on the rollers 9 in the manner shown in Figs. 1 and 2, and it is obvious that because of the weight of the tire and the ease of rotation of the rollers 9 that the tire casing can be grasped and caused to rotate at a sufficient speed to permit a painting or trimming operation to be easily and quickly performed.

It has been found very desirable to provide means when the tire casing is rotated to cause the casing to rotate in a single plane and to prevent it from traveling from one end of the rollers 9 to the other. Each roller 9, as shown in Figs. 1 and 3, is provided with a circumferential flange or guide 14 intermediate its ends, which guide will lie between the tire beads 15 when the tire casing is mounted thereon, and extend into the interior of the casing 8. These guides therefore tend to prevent the casing when it is rotated from creeping from one end of the rollers to the other, and will also guide the casing for rotation in a single plane. It will be noted, however, that the rollers are parallel with each other and that the guides 14 lie substantially in the same plane, which plane is coincident with the center line of the portion of the bracket 6 which is journaled in the carriage 2, so that the center line of the tire will be substantially coincident with the center line of the carriage in order that the center of gravity of the tire and supporting apparatus will occur substantially at the axis of the vertical portion of the bracket 6 in order to permit a free, unbinding pivotal movement of the same.

The guides 14 may be separate annular members secured to the rollers 9 or, if desired, they may be an integral part of the rollers as shown in the drawing. It is also preferred to converge the sides of each guide away from the roller so that if the tire casing has a tendency to shift laterally the inclined faces, which may engage the toe portions of the tire bead, will tend to cause the casing to slide back to its original position.

Suitable circumferential flanges 16 may also be provided at the other ends of the rollers 9, as shown in Fig. 3.

The advantages of the tire casing conveyor of the type described in the commercial production of tires are clearly obvious. The endless track 1 and the conveyor drive members 4 may be arranged to pass adjacent the tire vulcanizers and continue for any desired length to the storage and shipping departments or any other departments.

In operation, each tire casing when it is removed from the vulcanizer, is placed on the apparatus mounted on each carriage with the tire beads positioned at the sides of the intermediate guides 14 formed on the rollers 9. The offset bracket 6 may be grasped and easily pivoted to the position for placing the tire casing on the rollers, which will be most convenient for the workmen, with the result that needless motions are eliminated.

The trimming operator may be placed at any convenient location along the conveyor line and when the tire casing reaches his station he may grasp the offset bracket 6 and pivot the same to the position which will be most convenient for performing the trimming operation, and he may then rotate the tire casing on the rollers and easily and quickly remove the circumferential flash, and perform any of the other necessary finishing operations.

The painting operator may likewise be positioned at any convenient location along the line of the conveyor, and when each casing arrives at his station he may conveniently rotate the casing and paint the same with a suitable protective coating by means of a brush or spray apparatus.

In each case the particular operation may be easily and quickly performed without removing the casing from the conveyor, thus saving considerable time and labor, and eliminating many handling operations that have heretofore been necessary. Furthermore, the casing will rotate in each case in substantially a single plane without side-sway or transverse movement, thus also greatly aiding the operator in carrying out such operations as flash-trimming and painting.

Figure 4:
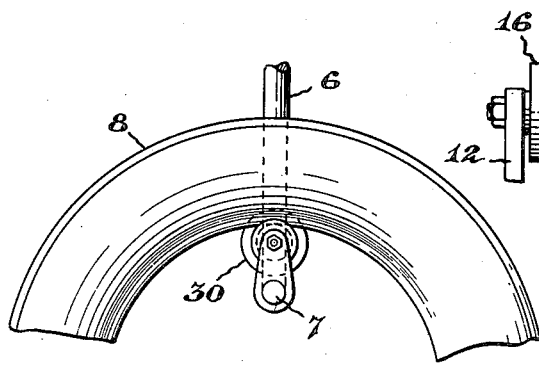
Fig. 4 is a fragmentary view showing an alternative means for supporting a tire casing on the conveying device, in which a single roller is used.

In Fig. 4 a conveyor similar to the one just described is illustrated. In this conveyor, however, a single roller 30 is employed which is preferably of the same type as shown in Fig. 3. This type may be used in cases where it is not necessary to employ great care in carrying out the particular operation to be performed.

Although the track and carriages are shown to be of the overhead type, it is to be understood that the same may be of the floor type commonly used. In this case, however, the supporting bracket will have to be more securely guided, than when it is freely suspended from the overhead track.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A tire casing conveying device comprising a movable carriage, a supporting bracket, a swivel member for rotatably mounting said bracket on said carriage, a roller member rotatably carried by said bracket for freely supporting a tire casing, and a circumferential flange on said roller member intermediate the ends thereof extendable into the tire casing between the tire beads for maintaining the tire casing on said conveying device whereby said tire casing may be rotated circumferentially and turned about a vertical axis during travel on said conveying device.

2. A tire conveying device comprising a movable carriage, a supporting bracket, a swivel member rotatably supporting said bracket from said carriage, a rotatable cylindrical roller horizontally mounted on said bracket for supporting the tire casing for substantially free circumferential rotation, and a circumferential guide flange having side faces converging away from said roller and carried on said roller intermediate the ends thereof for holding the tire casing against substantial axial movement on the roller during rotation of the tire casing.

3. A tire conveying device comprising a movable carriage, a supporting bracket mounted on said carriage, and a pair of spaced parallel rollers rotatably mounted on said bracket for supporting a tire casing for free rotation, each of said rollers having a circumferential element intermediate the ends thereof cooperatable with the toe portions of the tire casing beads for holding the casing against substantial axial movement during rotation.

4. A tire conveying device comprising a movable carriage, a supporting bracket mounted on said carriage, and a pair of spaced parallel rollers rotatably mounted on said bracket for supporting a tire casing for free rotation, each of said rollers having a circumferential element intermediate the ends thereof cooperatable with the toe portions of the tire casing beads for holding the casing against substantial axial movement during rotation, each circumferential element having side faces converging away from said roller.

5. A tire conveying device comprising a movable carriage, an offset bracket mounted on said carriage in pivoted relation permitting said bracket to rotate around a vertical pivot and having horizontal portions extending across the offset space, a cylindrical roller mounted on each of said horizontal portions for supporting a tire casing for free circumferential rotation, and a flange on each of said rollers intermediate the ends thereof for holding the tire casing against transverse movement relative to said rollers during rotation, the plane of the flanges being substantially coincident with the axis of pivotal movement of said bracket on said carriage.

6. A tire conveying device comprising a movable carriage, an offset supporting bracket pivoted to said carriage and having a horizontal portion extending across the space provided by said offset, a pair of spaced parallel rollers rotatably mounted on said horizontal portions for supporting a tire casing for free rotation, each of said rollers having a circumferential guide element intermediate the ends thereof cooperatable with the toe portions of the tire beads for holding the tire casing against substantial axial movement during rotation, the plane of said guide elements being substantially coincident with the axis of pivotal movement of said bracket.

7. A tire conveying device comprising an overhead track, a plurality of carriages movable along said track, an offset bracket pivotally mounted on said carriage and having a horizontal portion extending across the space provided by said offset, a pair of spaced parallel rollers rotatably mounted on said horizontal portions for supporting a tire casing for free rotation, each of said rollers having a circumferential guide element intermediate the ends thereof cooperatable with the toe portions of the tire beads for holding the tire casing against substantial axial movement during rotation, the plane of said guide elements being substantially coincident with the axis of pivotal movement of said bracket.

In testimony whereof I affix my signature.

EDWARD L. HALLINAN.